United States Patent
Miyauchi et al.

(10) Patent No.: US 6,800,963 B2
(45) Date of Patent: Oct. 5, 2004

(54) POWER CONTROLLER, POWER GENERATION SYSTEM, AND CONTROL METHOD OF POWER CONTROLLER

(75) Inventors: Shinji Miyauchi, Nara (JP); Tetsuya Ueda, Kasugai (JP); Masataka Ozeki, Izumi (JP); Hiroyuki Zimbo, Toyohashi (JP); Kiichi Koike, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/290,685

(22) Filed: Nov. 8, 2002

(65) Prior Publication Data

US 2003/0111990 A1 Jun. 19, 2003

(30) Foreign Application Priority Data

Nov. 9, 2001 (JP) ........................................ 2001-345089

(51) Int. Cl.[7] .............................. H02J 1/00; H02J 3/00
(52) U.S. Cl. ........................................... 307/86; 363/34
(58) Field of Search ................. 363/34, 37; 307/44–46, 307/48, 66, 80, 85, 86

(56) References Cited

U.S. PATENT DOCUMENTS 6,204,633 B1 * 3/2001 Kitagawa .................... 320/128
6,462,507 B2 * 10/2002 Fisher, Jr. ................... 320/101
6,645,653 B2 * 11/2003 Kashiwagi ..................... 429/22

FOREIGN PATENT DOCUMENTS

JP          06-325774          11/1994

* cited by examiner

*Primary Examiner*—Matthew V. Nguyen
(74) *Attorney, Agent, or Firm*—RatnerPrestia

(57) ABSTRACT

A power controller
   includes power storage means for storing DC power from DC power generation means that.

Power conversion means include a DC/DC converter that converts a voltage when receiving a DC input.

Charge and discharge means discharge electric power from the power storage means to the power conversion means and charge DC power from the DC power generation means in the power storage means. The charge and discharge means are provided among the DC power generation means, the power storage means and the power conversion means.

Detection means detect electric energy of an external power load to which power from at least the power conversion means is supplied.

Control means control operation of the charge and discharge means on the basis of the detected electric energy.

11 Claims, 11 Drawing Sheets

POWER CONTROLLER, POWER GENERATION SYSTEM, AND CONTROL METHOD OF POWER CONTROLLER

BACKGROUND OF THE INVENTION

1. Field of the Invention

The present invention relates to a power controller that performs electric power generation by using DC power generation means, for example, a fuel cell, or the like.

2. Related Art of the Invention

Heretofore, a system shown in FIG. 7 is known as a fuel cell power generation system (for example, refer to Japanese Patent Laid-Open No. 6-325774). In FIG. 7, a fuel cell 41 makes hydrogen, supplied by hydrogen supply means 42, and oxygen in air, which is supplied by air supply means 43, react in a main body of the fuel cell to generate DC power, which is converted into AC power by a power converter 44 and is outputted. A controller 45 can perform control so as to variably output electric power by electrical discharge from a charge and discharge apparatus 46 or charge to the charge and discharge apparatus 46 even if the generated power of the main body 41 of the fuel cell is fixed, by controlling the charge and discharge apparatus 46 and power converter 44.

Nevertheless, though it is necessary in such a fuel cell power generation system to match an output voltage of the main body 41 of the fuel cell to charge and discharge voltages of the charge and discharge apparatus 46, the charge and discharge apparatus 46 does not have means of controlling charge and discharge. Hence, it is difficult to control the charge and discharge of the charge and discharge apparatus 46 in high accuracy by compensating the difference between the output of the main body 41 of the fuel cell and ratings of power storage means such as a secondary cell in the charge and discharge apparatus 46.

The following system is conceivable for canceling such a fault. FIG. 8 shows a configuration of a fuel cell power generation system according to a second conventional example. In FIG. 8, a fuel cell 51 is a main body of a fuel cell to generate DC power by reacting hydrogen with oxygen in air. A DC/DC converter 52 boosts a voltage of DC power of the fuel cell 51. A power converter 53 (inverter) converts the DC power, boosted by the DC/DC converter 52, into AC power to output the AC power to an electric power load 55. A controller 54 is the means of detecting a load current of the electric power load 55 by a load current detector 56 and controlling a two-way DC/DC converter 57, the DC/DC converter 52, and the power converter 53.

The controller 54 stores electric power in a storage battery 58 through the two-way DC/DC converter 57 when a value of an output current from the main body 51 of the fuel cell according to the load current of electric power load 55 exceeds a load current value. When a value of the output current from the main body 51 of the fuel cell is insufficient for the load current value, the controller 54 supplies the electric power of the storage battery 58 to the electric power load 55 through the two-way DC/DC converter 57.

The fuel cell power generation system according to the above-mentioned second conventional example (FIG. 8) has a configuration in which the power converter 53 is connected to the two-way DC/DC converter 57 for the charge and discharge control of the storage battery 58 coupled with an output of the DC/DC converter 52 that boosts DC power to a voltage necessary for converting DC power into AC power.

This system is made not only to control an output of the main body 51 of the fuel cell by the DC/DC converter 52, but also to raise charge and discharge efficiencies of the storage battery 58 by controlling the two-way DC/DC converter 57. Accordingly, charge from the fuel cell 51 to the storage battery 58 is performed through two voltage control means of the DC/DC converter 52 and two-way DC/DC converter 57.

Nevertheless, since there is large difference between charge and discharge voltages of the storage battery 58 and an output voltage boosted by the DC/DC converter 52 (in general, the output voltage boosted by the DC/DC converter 52 is higher), it is necessary to increase the difference between step-up voltages and step-down voltages of the two-way DC/DC converter 57 according to the above difference. Hence, it is difficult to raise power conversion efficiency.

Moreover, there are issues that operating economy is low since total power conversion efficiency which is a product of a power conversion efficiency of the two-way DC/DC converter 57 and charge and discharge efficiencies of the storage battery 58 becomes low, in addition, cost also becomes high since a price of the two-way DC/DC converter 57 itself is also high.

SUMMARY OF THE INVENTION

In consideration of the above-mentioned issues, the present invention provides a fuel cell power controller, which quickly corresponds to a change of electric power demand, highly effectively generates electric energy required, and is highly economical and reliable, a power generation system using it, or the like.

One aspect of the present invention is a power controller comprising:

power storage means of storing DC power outputted from DC power generation means that generates DC power;

power conversion means of including at least a DC/DC converter that converts a voltage when receiving a DC input;

charge and discharge means of discharging electric power from the power storage means to the power conversion means and of charging DC power from the DC power generation means in the power storage means, the charge and discharge means being provided among the DC power generation means, the power storage means and the power conversion means;

detection means of detecting electric energy of an external power load to which power from at least the power conversion means is supplied; and control means of controlling operation of the charge and discharge means on the basis of the detected electric energy, wherein the charge and discharge means has a DC/DC conversion function, converts an output voltage of the DC power generation means into a charge voltage of the power storage means, and converts a discharge voltage of the power storage means into an output voltage of the DC power generation means.

Another aspect of the present invention is the power controller, according to the 1st invention.

wherein the control means performs control of making the charge and discharge means perform the charge operation when the external power load is low, and making the charge and discharge means perform the discharge operation when the external power load is high.

Still another aspect of the present invention is the power controller, according to the 1st invention,
wherein the amount of converted voltage between an output of the DC power generation means and an input of the power storage means is smaller than the amount of converted voltage between an output of the DC power generation means and an input of the DC/DC converter of the power conversion means.

Yet still another aspect of the present invention is the power controller, according to the 1st invention, wherein the charge and discharge means comprises:
charge side conversion means of converting an output voltage of the DC power generation means into a charge voltage of the power storage means; and
discharge side conversion means of converting a discharge voltage of the power storage means into an output voltage of the DC power generation means.

Still yet another aspect of the present invention is the power controller, according to the 1st invention, wherein the charge and discharge means comprises:
common conversion means of performing a charge side conversion operation in which an output voltage of the DC power generation means is converted into the charge voltage of the power storage means or a discharge side conversion operation in which a discharge voltage of the power storage means is converted into an output voltage of the DC power generation means;
a first control switch of performing control so that an input side of the common conversion means is connected to an output side of the DC power generation means or an output side of the power storage means; and
a second control switch of performing control so that an output side of the common conversion means is connected to an input side of the DC/DC converter or an input side of the power storage means, and
when the charge side conversion operation is performed, the first control switch connects the output side of the DC power generation means to the input side of the common conversion means while the second control switch connects the output side of the common conversion means to the input side of the power storage means, and
when the discharge side conversion operation is performed, the first control switch connects the output side of the power storage means to the input side of the common conversion means while the second control switch connects the output side of the common conversion means to the input side of the DC/DC converter.

A further aspect of the present invention is the power controller, further comprising output voltage detection means of detecting an output voltage of the DC power generation means,
wherein on the basis of the detected output voltage and the detected load power, the control means makes the charge and discharge means perform the charge operation when the detected output voltage is high and the detected load power is low, and makes the charge and discharge means perform the discharge operation when the detected output voltage is low and the detected load power is high.

A still further aspect of the present invention is the power controller, further comprising power storage detection means of detecting power storage of the power storage means,
wherein the control means controls operation of the charge and discharge means on the basis of the detected power storage.

A yet further aspect of the present invention is the power controller, further comprising loadpower measurement means of measuring the detected electric energy as a function of time,
wherein a power generation schedule of the DC power generation means is determined on the basis of electric energy measured beforehand by the electric load power measurement means.

A still yet further aspect of the present invention is the power generation system comprising:
the power controller according to the 1st invention;
DC power generation means of generating DC power; and
control means of DC power generation means of controlling input energy of the DC power generation means on the basis of the detected electric energy.

An additional aspect of the present invention is a control method of the power controller,
wherein the electric energy is measured as a function of time, and
a power generation schedule of DC power generation means is determined on the basis of the electric energy obtained by the measurement.

DESCRIPTION OF SYMBOLS

Figure 1:
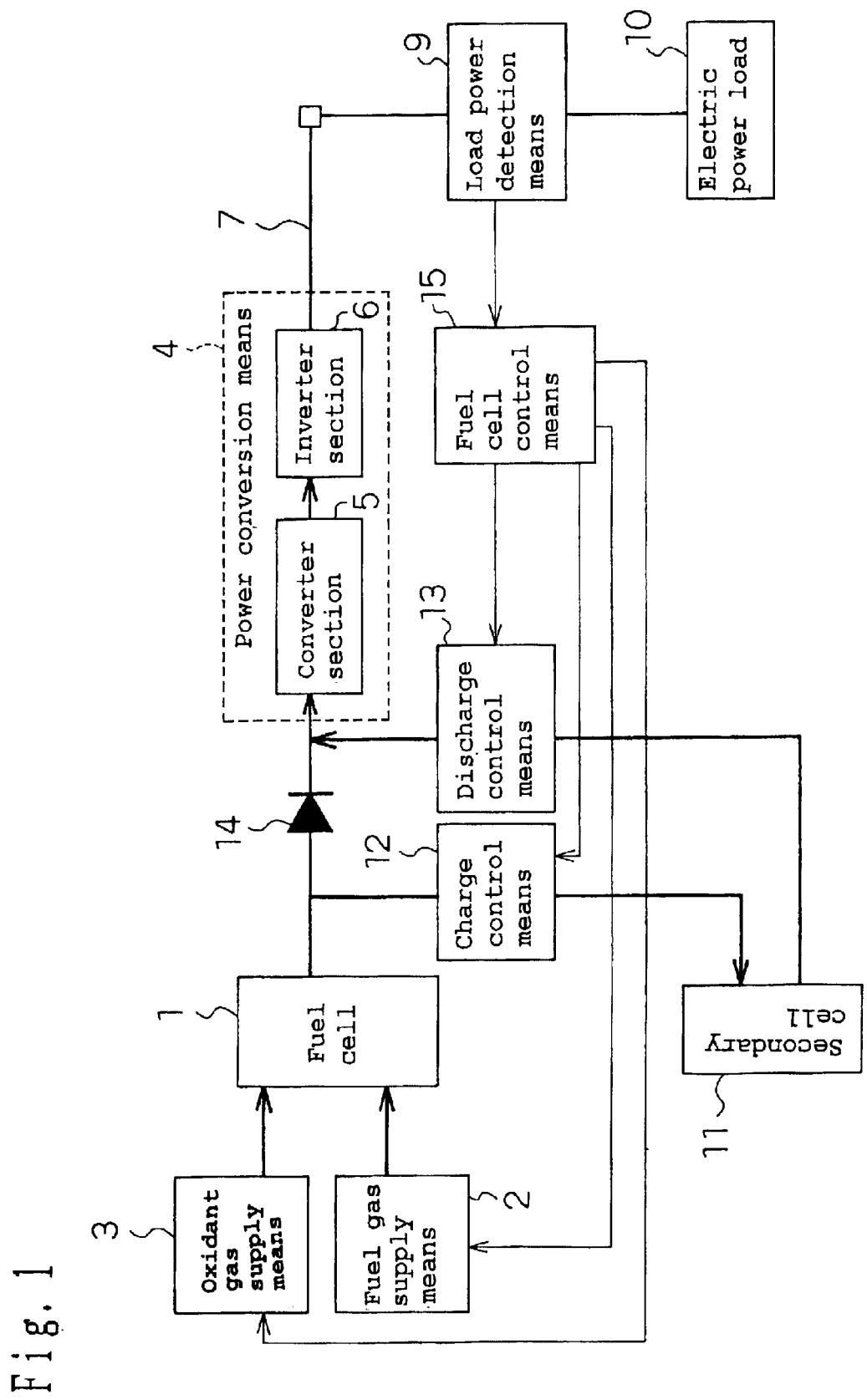
FIG. 1 is a block diagram of a fuel cell power generation apparatus in a first embodiment of the present invention.

1 Fuel cell
2 Fuel gas supply means
3 Oxidant gas supply means
4 Power conversion means
5 Converter section
6 Inverter section
9 Load power detection means
10 Electric power load
11 Secondary cell 12 Charge control means
13 Discharge control means
14 Back flow preventing diodes
15 Fuel cell control means

PREFERRED EMBODIMENTS OF THE INVENTION

Hereafter, embodiments of the present invention will be explained with reference to drawings.

Embodiment 1

FIG. 1 is a block diagram of a fuel cell power generation apparatus in a first embodiment of the present invention.

Fuel gas supply means 2, which contains hydrogen, such as a refining machine, a hydrogen-absorbing alloy, and a hydrogen cylinder, and oxidant gas supply means 3, which contains oxygen, such as a blower and a ventilation pump are connected to a fuel cell 1 that corresponds to the DC power generation means of the present invention.

Power conversion means 4 is a means of converting a DC power into a AC power and has a configuration in which firstly the converter section 5 boosts a DC voltage in regard to the DC power from the fuel cell 1 and secondary the inverter section 6 converts the DC power having boosted voltage into the AC power to be outputted.

An output line 7 is a means electrically connected to the power conversion means 4, and also is electrically connected to an electric power load 10. Moreover, load power detection means 9 is a means of detecting the electric power outputted through the output line 7 on the basis of the operation of the electric power load 10. A secondary cell 11 corresponds to the power storage means of the present invention, and is means of charging and storing electric power, and discharging the stored electric power. Charge control means 12 is a means of converting DC power of the fuel cell 1 into a suitable voltage as the charging voltage of the secondary cell 11 and charging the secondary cell 11, and is implemented with, for example, a step-up and step-down voltage chopper circuit. Moreover, discharge control means 13 is a means of converting the stored power to be discharged from the secondary cell 11 into substantially the same voltage as a DC output voltage of the fuel cell 1 and outputting the power to the power conversion means 4, and is implemented with, for example, a step-up and step-down voltage chopper circuit. A back flow preventing diode 14 is means of preventing the back flow of DC power from the discharge control means 13 to the fuel cell 1. Fuel cell control means 15 is a means of controlling the supply quantity of a fuel gas from the fuel gas supply means 2 to the fuel cell 1 and/or the supply quantity of an oxidant gas from the oxidant gas supply means 3 to the fuel cell 1, and of controlling an input and an output of storage power of the secondary cell 11 by controlling the charge control means 12 and discharge control means 13 according to the electric power load 10.

An purpose of installing the secondary cell 11 is to prevent the deterioration of economy due to the excess or deficiency of output power to load power in system interconnection by using the charge and discharge of the secondary cell 11.

Next, not only operation in this first embodiment will be explained, but also an embodiment of a power control method according to an invention by the present invention will also be explained.

The fuel gas supplied by the fuel gas supply means 2 and oxygen in the oxidant gas supplied by the oxidant gas supply means 3 react in the fuel cell 1 to generate a direct current. The generated direct current is sent to the power conversion means 4. In the power conversion means 4, after boosted by the converter section 5, the direct current is converted into alternating current of the same voltage as that of the electric power load 10 by the inverter section 6 and is supplied to the electric power load 10 through the output line 7.

Here, when the output power of the fuel cell 1 is found insufficient for the load power of the electric power load 10 on the basis of electric energy detected by the load power detection means 9, the fuel cell control means 15 makes the secondary cell 11 complement the shortfall of the generated output for the electric power load 10 through the discharge control means 13.

In addition, in this embodiment, when the secondary cell 11 is charged, the output voltage from the fuel cell 1 is converted into a voltage substantially equal to the charge voltage of the secondary cell 11 by the charge control means 12. Further, when discharge from the secondary cell 11 to the power conversion means 4 is performed, the output voltage from the secondary cell 11 is converted into a voltage substantially equal to the output voltage of the fuel cell 1 by the discharge control means 13 for the power to be outputted to the converter section 5 of the power conversion means 4. Hence, it is possible to keep charge and discharge efficiencies of the secondary cell 11 at a high level. At this time, in the upper and lower relation between an output voltage of the fuel cell 1 and a charge voltage of the secondary cell 11, when the voltage of the fuel cell 1 is higher, the charge control means 12 steps down the voltage, and the discharge control means 13 steps up the voltage.

Moreover, when the voltage of the fuel cell 1 is lower, the charge control means 12 steps up the voltage, and the discharge control means 13 steps down the voltage. At this time, references of the step-up and step-down voltages can be either the output voltage of the fuel cell 1 or the charge and discharge voltages of the secondary cell 11. In addition, the output voltage of the fuel cell 1 may be a value obtained by measuring the fuel cell 1, or may be a value (fixed value) set beforehand on the basis of ratings etc.

Moreover, in this embodiment, charge to the secondary cell 11 is made by directly taking electric power from the output of fuel cell 1 to the charge control means 12. Furthermore, an output from the secondary cell 11 to the power conversion means 4 is matched to the output voltage of the fuel cell 1 immediately before converter section 5.

Figure 8:
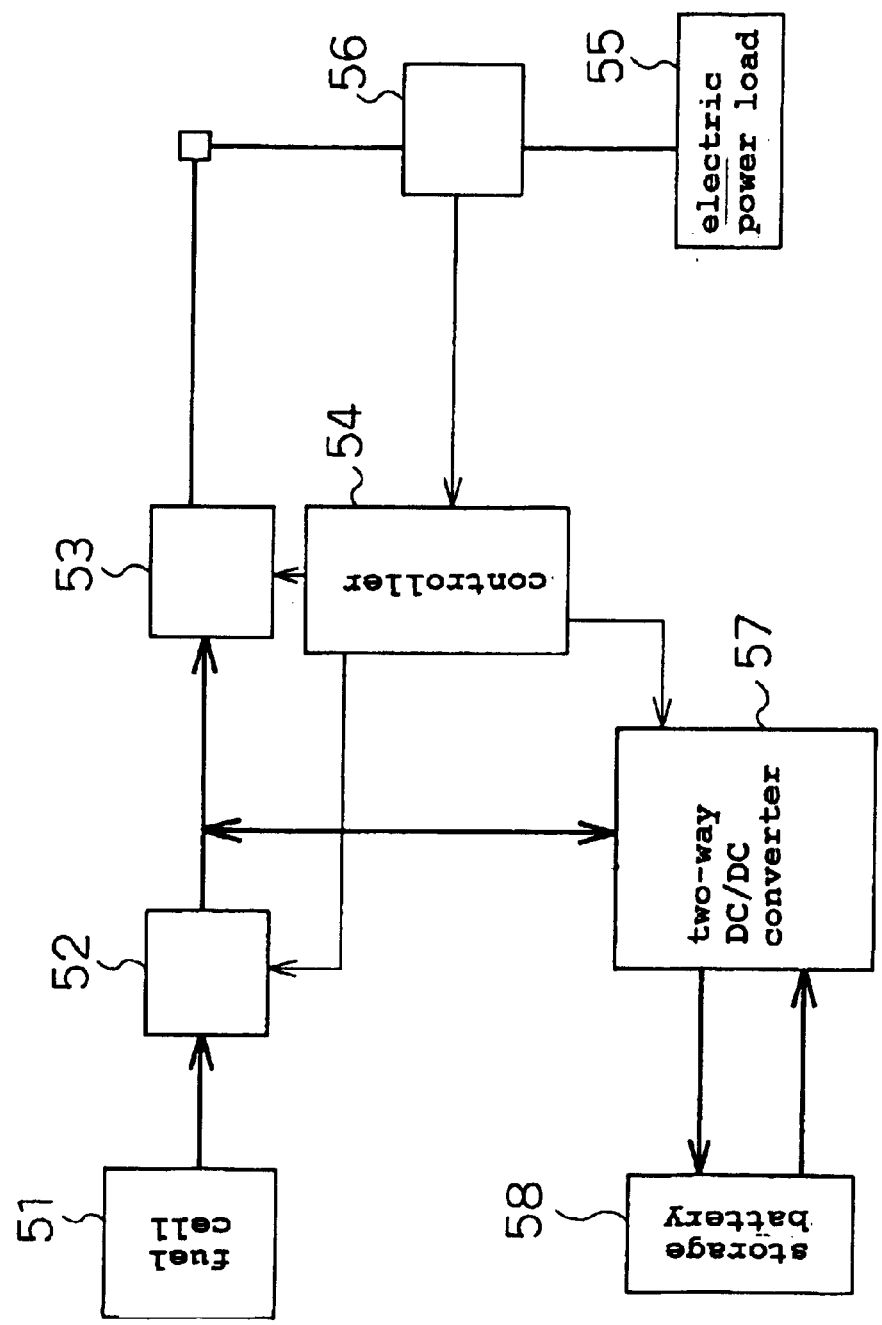
FIG. 8 is a block diagram of a conventional fuel cell power generation system.

In this embodiment, voltage conversion quantity to the secondary cell 11 by the charge control means 12 is extremely small in comparison with a second conventional example shown in FIG. 8, that is, several volts to tens of volts. Similarly, voltage conversion quantity to the power conversion means 4 by the discharge control means 13 is also small, that is, several volts to tens of volts.

Hence, since the power loss etc. (switching loss, core loss of reactors, ohmic loss, etc.) of power conversion elements of the charge control means 12 and discharge control means 13 decreases, a power conversion efficiency in the case that the electric energy of charge and discharge is about 1 to 2 kW becomes as high as 90% or more.

Moreover, since the charge and discharge efficiencies of the secondary cell 11 is 92 to 93%, it is possible to raise the total charge and discharge energy efficiencies at the time of using the secondary cell 11. Hence, it is possible to provide a fuel cell power generation apparatus with high economy since it is possible to perform economical operation as a power storage system that supplements the excess and deficiency of an output of the fuel cell 1 and it is also possible to realize the configuration of a control circuit of the charge control means 12 and discharge control means 13 with low cost.

Figure 9:
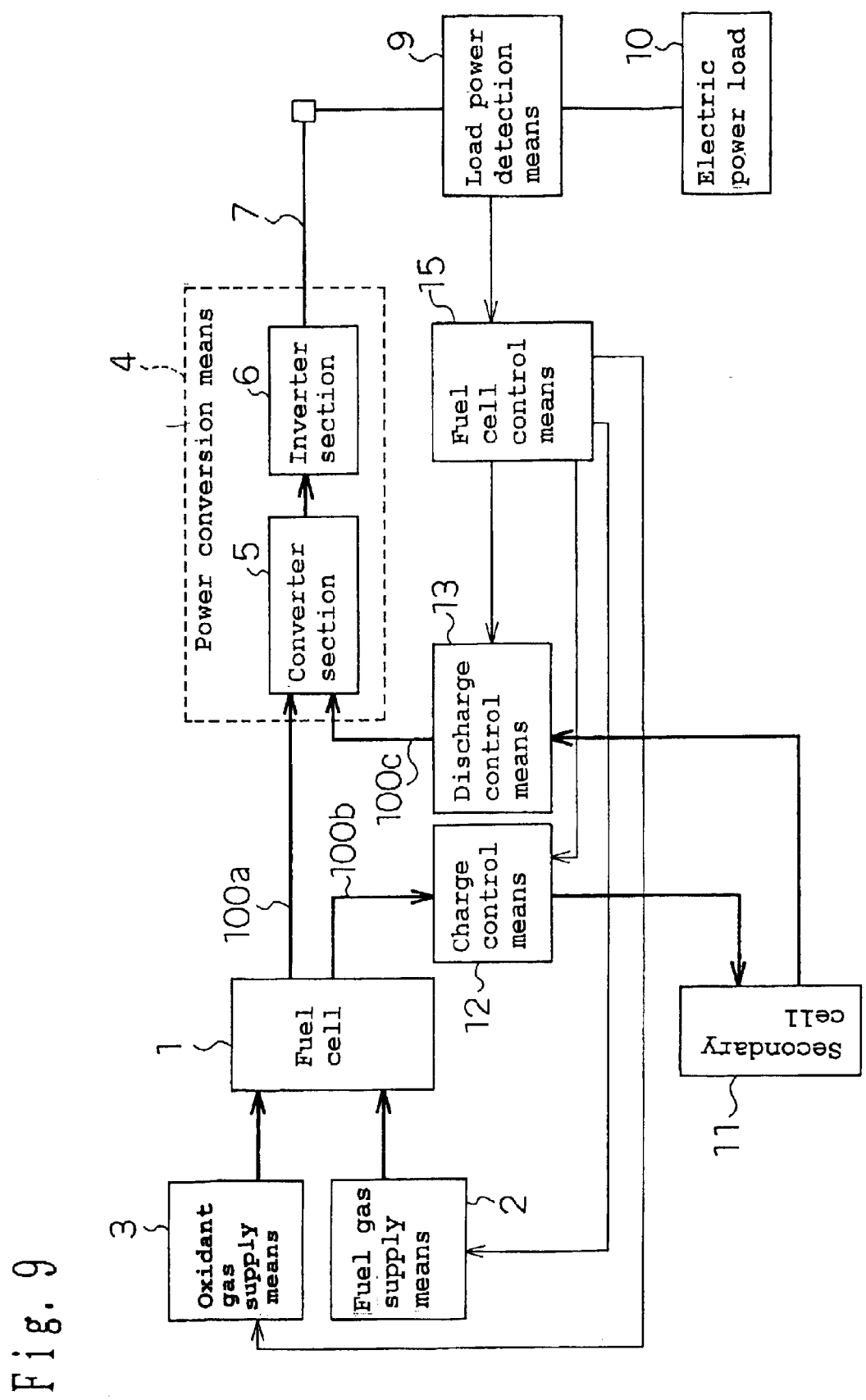
FIG. 9 is a diagram showing another configuration of the fuel cell power generation apparatus in the first embodiment of the present invention.

In addition, this embodiment can also be constituted as shown in FIG. 9. Points different from the configuration shown in FIG. 1 are as follows. The back flow preventing diode 14 is omitted, and two systems of outputs of the fuel cell 1 are provided. One system is used as a connection path 100a, connected directly to the converter section 5 of the power conversion means 4, and the other system is used as the connection path 100b, connected to the charge control means 12. Moreover, a connection path 100c that directly connects the discharge control means 13 to the converter sections 5 of the power conversion means 4 is provided. In this case, it is possible to completely prevent an output of the discharge control means 13 from flowing backward to the fuel cell 1 or charge control means 12 in a configuration that is simpler and less expensive than that of FIG. 1.

Embodiment 2

Figure 3:
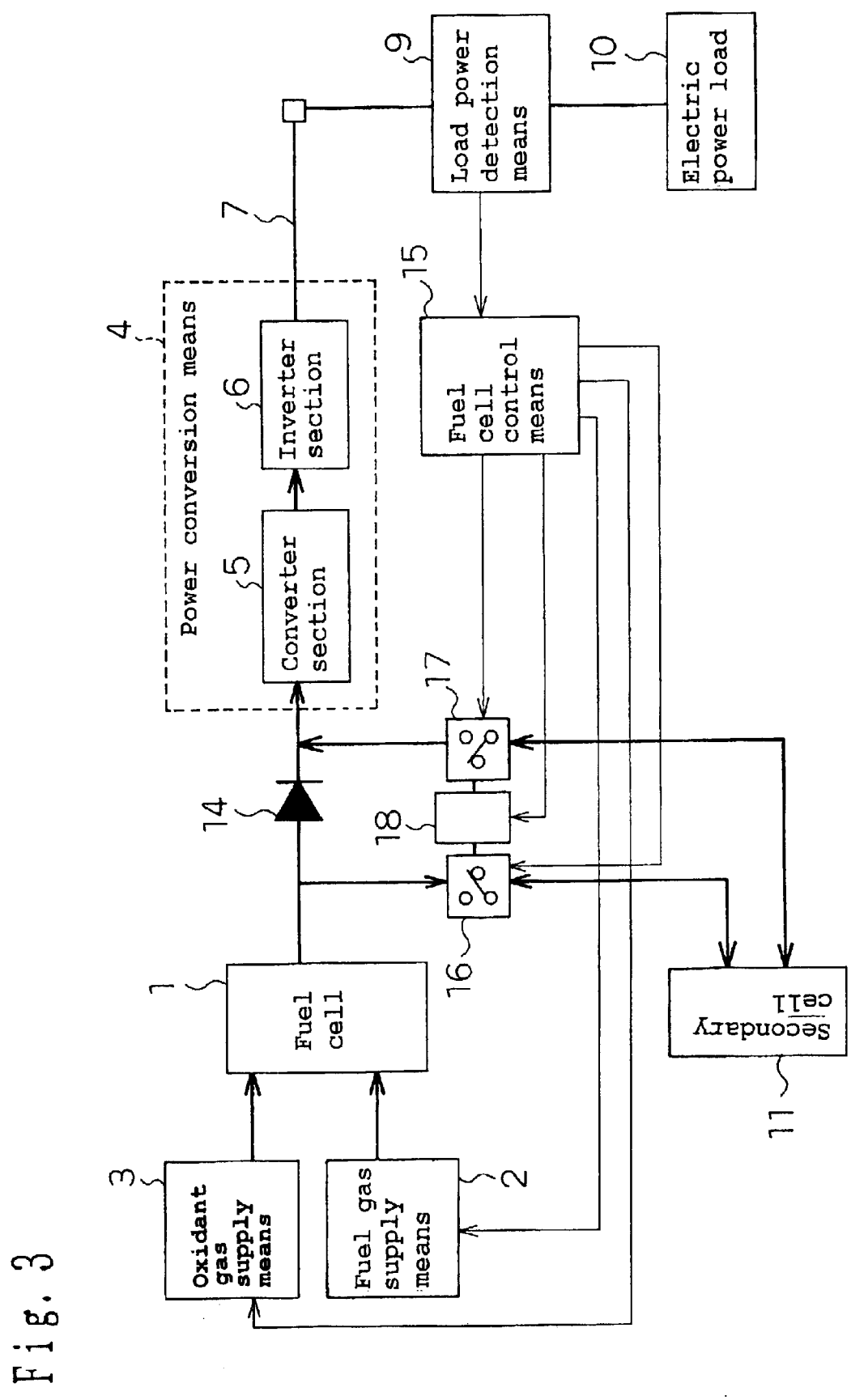
FIG. 3 is block diagram of a fuel cell power generation apparatus in a second embodiment of the present invention.

FIG. 3 is a block diagram of a fuel cell power generation apparatus in a second embodiment of the present invention.

In FIG. 3, the same numerals are assigned to parts having the same functions as those of the fuel cell power generation apparatus of the first embodiment shown in FIG. 1, and the detailed description of those functions will be omitted as those corresponding to those in FIG. 1.

Charge and discharge control means 18 is the means of storing DC power, generated in the fuel cell 1, in the secondary cell 11 as power storage means, and controlling charge and discharge for outputting the stored power from the secondary cell 11 to the converter 5 of the power conversion means 4, and is constituted of, for example, a step-up and step-down voltage chopper circuit etc. Current switching means 16 and 17 are the means of switching the current directions of charge from the fuel cell 1 and discharge to the converter 5 of the power conversion means 4, and the current switching means 16 performs switching so as to connect the charge and discharge control means 18 to an output terminal of the fuel cell 1 or an output terminal of the secondary cell 11. Moreover, the current switch means 17 performs switching so as to connect the charge and discharge control means 18 to an input terminal of the converter 5 of the power conversion means 4 or an input terminal of the secondary cell 11. Moreover, the current switching means 16 and 17 are constituted of semiconductor switches, mechanical switches, or the like.

Next, the operation of this second embodiment will be explained. Nevertheless, parts similar to those in the first embodiment will be omitted, and difference will be mainly described.

In the operation of the fuel cell power generation apparatus, when the load power detection means 9 detects the shortfall of electric power in the apparatus to the electric power load 10, the fuel cell control means 15 controls the current switching means 16 so as to connect an output terminal of the secondary cell 11 to an input terminal of the charge and discharge control means 18, and controls the current switch means 17 so as to connect an output terminal of the charge and discharge control means 18 to an input terminal of the converter 5 of the power conversion means 4, in order to supply the shortfall of the generated power to the electric power load 10 from the secondary cell 11.

Thereby, electric power outputted from the secondary cell 11 is supplied in order of the current switching means 16, charge and discharge control means 18, current switching means 17, and power conversion means 4.

Next, in a time zone or the like when the electric power load of the fuel cell 1 is low and an output voltage of the fuel cell 1 suitable for the charge of the secondary cell 11 is high, the fuel cell control means 15 controls the current switching means 16 so as to connect an output terminal of the fuel cell 1 to an input terminal of the charge and discharge control means 18, and controls the current switching means 17 so as to connect an output terminal of the charge and discharge control means 18 to an input terminal of the secondary cell 11, in order to charge the secondary cell 11.

Thereby, electric power outputted from the fuel cell 1 is supplied in order of the current switching means 16, charge and discharge control means 18, current switching means 17, and secondary cell 11.

In the fuel cell power generation apparatus, since charge operation and discharge operation to the secondary cell 11 are not performed at the same time, the remainder becomes unnecessary when either the charge control or the discharge control operates. Hence, it becomes possible to unify two types of means for voltage control in the first embodiment by switching the charge and discharge control to the secondary cell 11 with one charge and discharge control means and two current switching means at each operation. Hence, it becomes possible to simplify, miniaturize, and lower the cost of charge and discharge control configuration.

Figure 10:
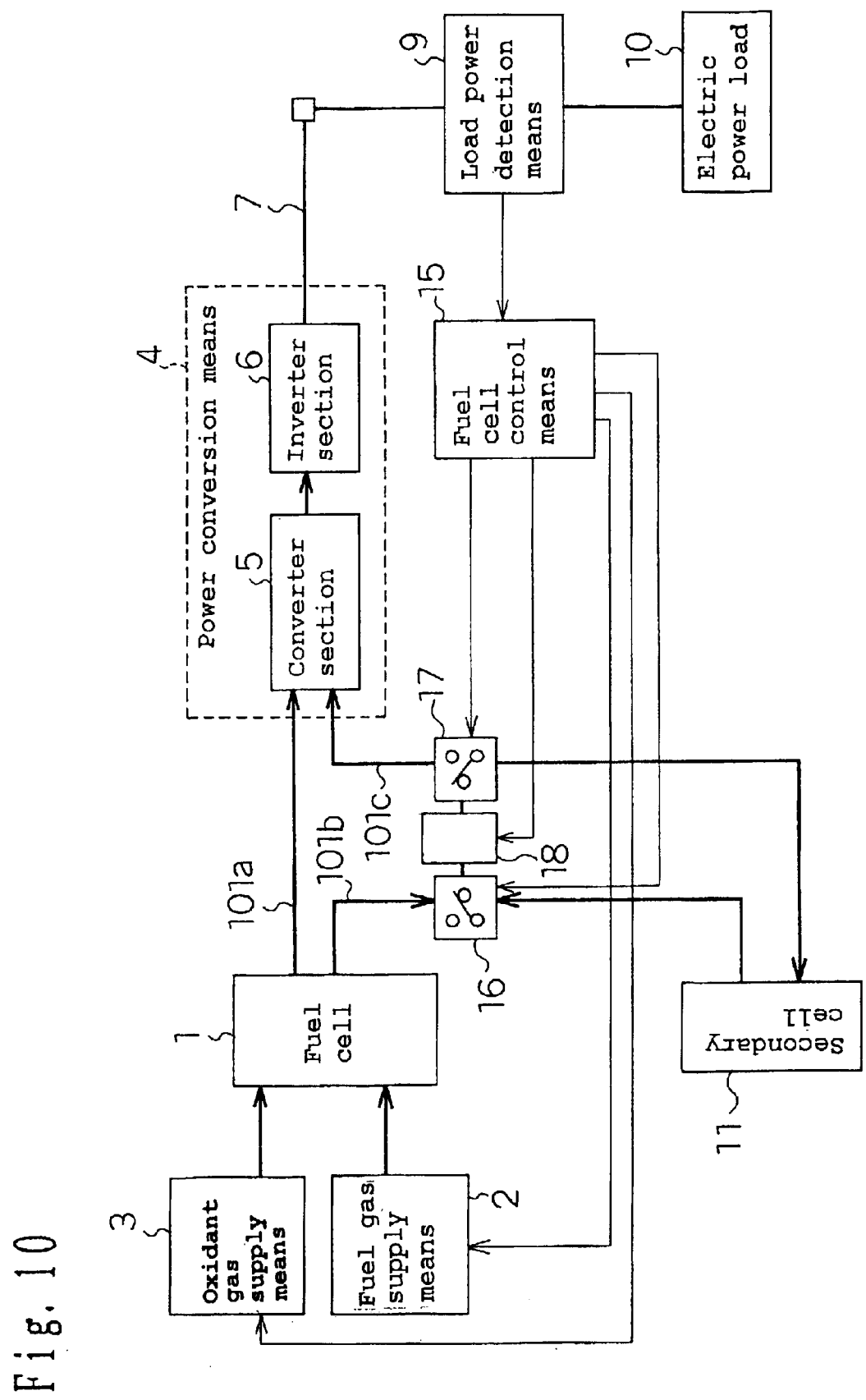
FIG. 10 is a diagram showing another configuration of the fuel cell power generation apparatus in the second embodiment of the present invention.

In addition, this embodiment can be also constituted as shown in FIG. 10 similarly to the first embodiment. Points different from the configuration shown in FIG. 3 are as follows. That is, the back flow preventing diode 14 is omitted, and two systems of outputs of the fuel cell 1 are provided. One system is used as a connection path 101a connected directly to the converter section 5 of the power conversion means 4, and the other system is used as the connection path 101b connected to the current switching means 16. Moreover, a connection path 101c that directly connects the current switching means 17 to the converter sections 5 of the power conversion means 4 is provided.

In this case, it is possible to completely prevent an output of the charge and discharge control means 18 from flowing backward to the fuel cell 1 in the configuration that is simpler and more inexpensive than that in FIG. 1.

Embodiment 3

Figure 4:
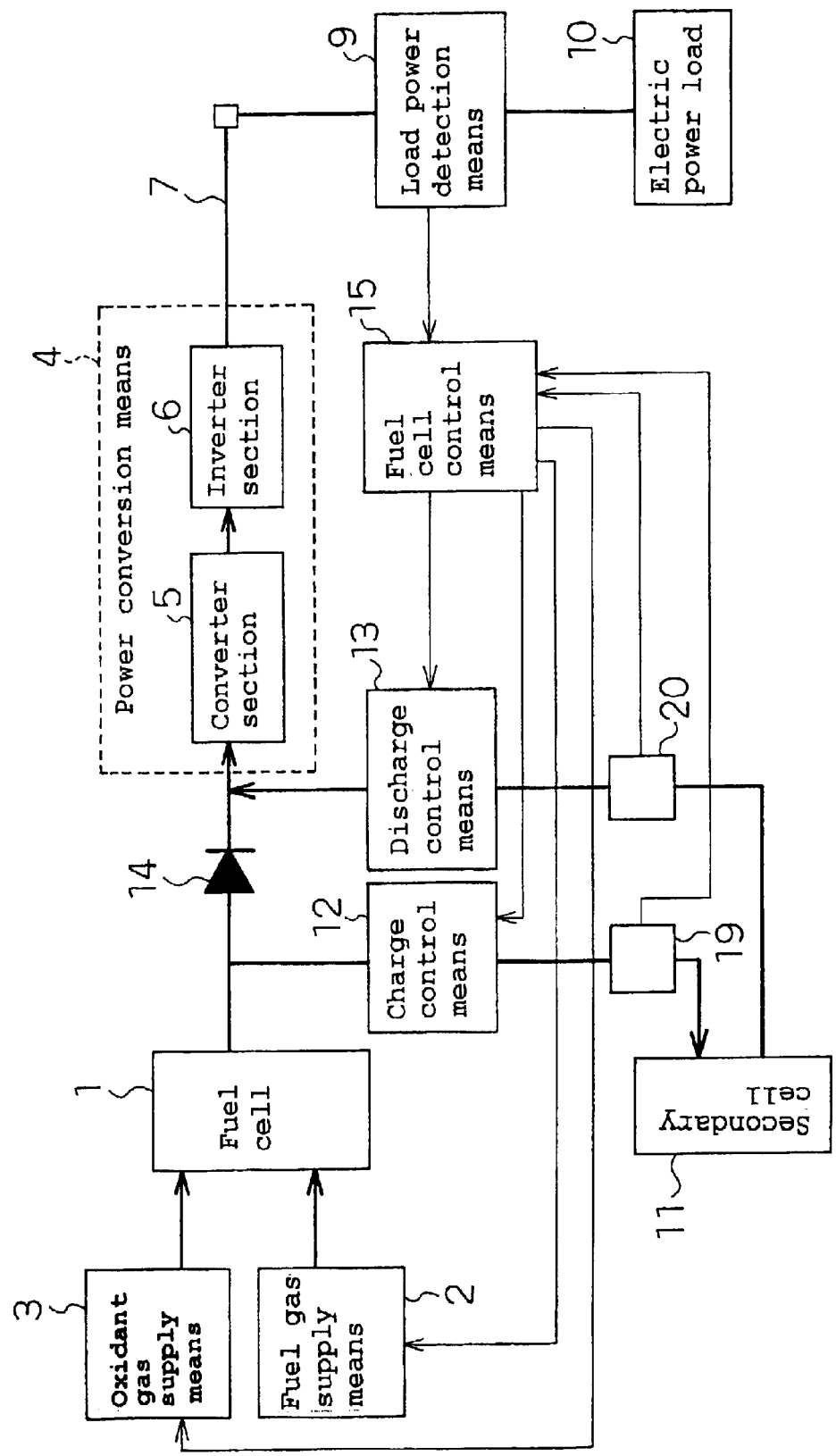
FIG. 4 is a block diagram of a fuel cell power generation apparatus in a third embodiment of the present invention.

FIG. 4 is a block diagram of a fuel cell power generation apparatus in a third embodiment of the present invention. In FIG. 4, the same numerals are assigned to parts having the same functions as those of the fuel cell power generation apparatus of the first embodiment shown in FIG. 1 and the fuel cell power generation apparatus of the second embodiment shown in FIG. 3, and the detailed description of those functions will be omitted as those corresponding to those in FIGS. 1 and 3.

A current sensor 19 is the means of detecting a charge current at the time when electric power by a power generation reaction from the fuel cell 1 is charged to the secondary cell 11 through the charge control means 12. Moreover, a current sensor 20 is the means of detecting a discharge current at the time when stored electric power from the secondary cell 11 is discharged to the power conversion means 4 through the discharge control means 13.

Next, the operation of this third embodiment will be explained. Nevertheless, portions similar to those in the first embodiment will be omitted, and, difference will be mainly described.

The fuel cell control means 15 always monitors a charge current from the current sensor 19 and a discharge current from the current sensor 20, and always grasps the stored electric energy of the secondary cell 11 by performing time integration and addition respectively.

Then, when the secondary cell 11 is discharged, the fuel cell control means 15 stops electrical discharge by controlling the discharge control means 13 when the electric power storage becomes equal to or less than the first power storage. Here, the first power storage is a lower limit of a region suitable for charge-discharge characteristics of the remaining battery capacity that is a State of Charge (SOC) or Depth of Discharge (DOD) of the secondary cell 11, and is set at, for example, about 50% of battery capacity.

Next, the fuel cell control means 15 charges the secondary cell 11 in a time zone when the electric power load of fuel cell 1 is low and an output voltage of the fuel cell 1 suitable for the charge of the secondary cell 11 is high. At this time, the fuel cell control means 15 stops electrical charge by controlling the charge control means 12 when the power storage becomes equal to or more than the second power storage. Here, the second electric power storage is a highest limit of a region suitable for charge-discharge characteristics of the remaining battery capacity that is the State of Charge (SOC) or Depth of Discharge (DOD) of the secondary cell 11, and is set at, for example, about 80 to 90% of the battery capacity.

Hence, by managing the quantity of electrical charge and discharge of the secondary cell 11 between the first power storage and the second power storage constantly, the durability of the secondary cell 11 improves remarkably. In addition, since it becomes extremely economical configuration as the configuration of auxiliary means for the power supply of the fuel cell 1, the facilities cost of the power generation apparatus is decreased.

In addition, though it is described in the above-described embodiment that the electric power storage of the secondary cell 11 is calculated on the basis of values detected by the current sensor 19 for detecting a charge current, and the current sensor 20 for detecting a discharge current, it can be possible to perform control operation based on the electric power storage in secondary cell 11 that is directly measured.

Embodiment 4

Figure 5:
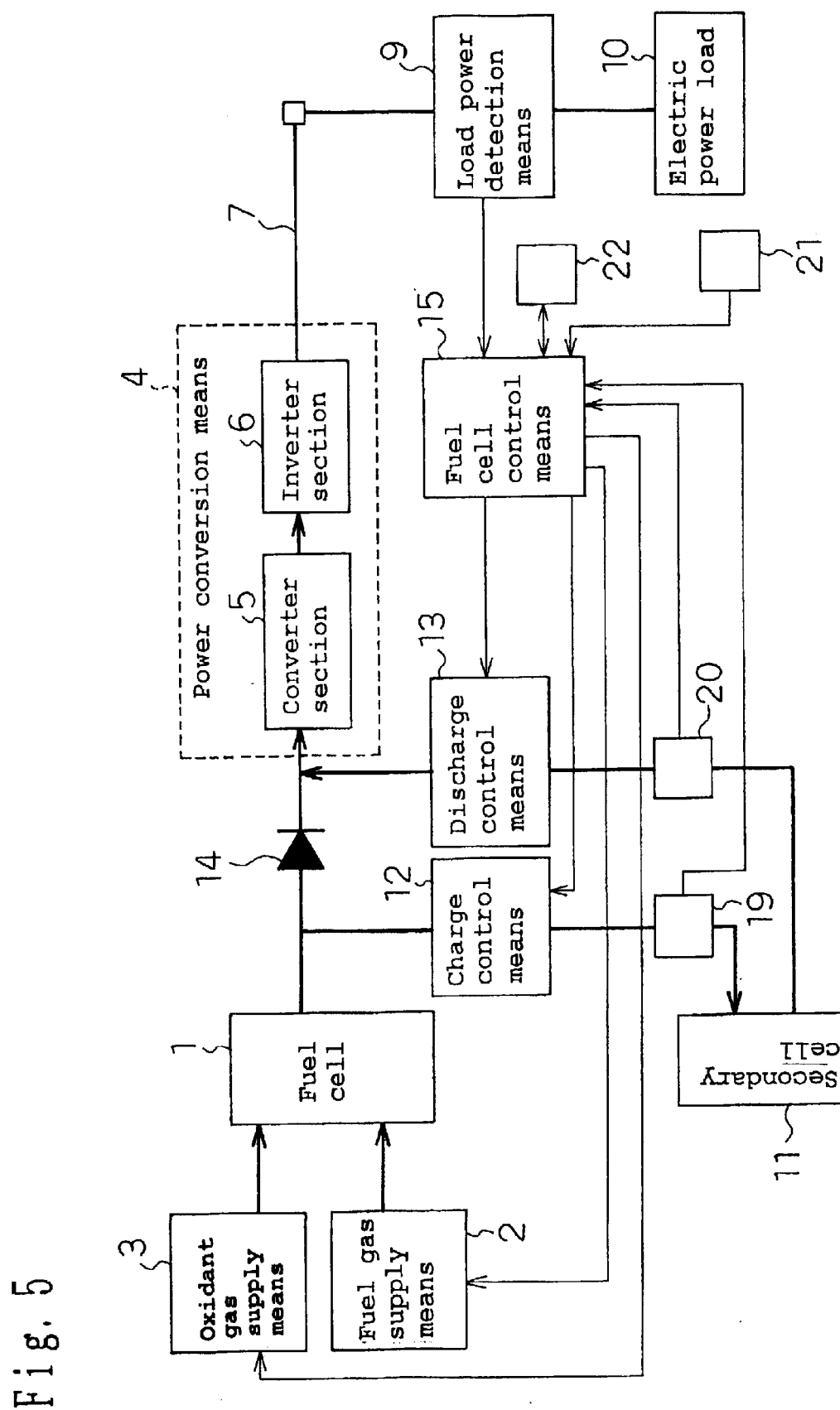
FIG. 5 is a block diagram of a fuel cell power generation apparatus in a fourth embodiment of the present invention.

FIG. 5 is a block diagram of a fuel cell power generation apparatus in a fourth embodiment of the present invention. In FIG. 5, the same numerals are assigned to parts having the same functions as those of the fuel cell power generation apparatus of the first embodiment shown in FIG. 1, the fuel cell power generation apparatus of the second embodiment shown in FIG. 3, and the fuel cell power generation apparatus of the third embodiment shown in FIG. 4, and the detailed description of those functions will be omitted as those corresponding to those in FIGS. 1, 3, and 4.

This embodiment is characterized by the configuration of inputting to the fuel cell control means 15 a timing signal from timing means 21 such as a timer that measures time, and power consumption pattern information from electric energy memory means 22 such as semiconductor memory that stores power consumption at each time.

Next, the operation of this fourth embodiment will be explained. Nevertheless, portions similar to those in the above-described embodiments will be omitted, and, difference will be mainly described.

The fuel cell control means 15 makes the electric energy memory means 22 store the electric energy detected by the load power detection means 9 as electric energy monitor information (relation between time and power consumption during a day) with regarding electric power to time according to the timing means 21. Then, on the basis of this electric energy monitor information, the fuel cell control means 15 outputs signals to the fuel gas supply means 2 and oxidant gas supply means 3 so that an electric power output after storage may become the same output at each timing corresponding to the electric energy monitor information. In addition, the fuel cell control means 15 charges the secondary cell 11 through the charge control means 12 in a time zone when the electric power load of fuel cell 1 is low and an output voltage of the fuel cell 1 suitable for the charge of the secondary cell 11 is high and secures charge time. Moreover, the fuel cell control means 15 charges the secondary cell 11 at an every predetermined operation time on the basis of an electric energy pattern stored in the electric energy memory means 22, in a time zone when an output of power generation from the fuel cell 1 is a predetermined output or less, until electric power storage reaches full electric power storage through the charge control means 12, and charge time when the electric power storage reaches the full electric power storage exceeds predetermined time.

At this time, "every predetermined operation time" means a time interval when refresh charge operation indispensable for excellently maintaining charge and discharge characteristics of the secondary cell 11 that is the power storage means is performed, and the interval is once a week or ten days. Furthermore, "until charge time when the electric power storage reaches the full electric power storage exceeds predetermined time" means "until an end of constant-voltage charge (forced charge) for completing the charge operation after the secondary cell 11 reaches full charge", and "predetermined time" is the time when a state that a charge current becomes almost zero elapses for 2 to 3 hours.

Since a variable portion of actual load power is large to an average output power based on electric energy monitor information, electric power output control does not always become such control that the electric power storage of the secondary cell 11 is always compensated, and discharge quantity and charge quantity become almost equal. Hence, a series of these operation controls is made to secure the electric power storage of the secondary cell 11 in a time zone when charge can be secured according to the electric energy monitor information of the electric energy memory means 22, and to excellently maintain the charge-discharge characteristics of the secondary cell 11.

Hence, the fuel cell control means 15 charges the secondary cell 11 on the basis of the electric energy pattern, stored in the electric energy memory means 22, in a time zone when a power generation output from the fuel cell is a predetermined output or less until the electric power storage reaches the full electric power storage through the charge control means 12, and the charge time reaching the full electric power storage exceeds the predetermined time. Hence, since the regular charge refresh operation of the secondary cell 11 can be secured, the life property of the secondary cell 11 improves greatly.

Embodiment 5

Figure 6:
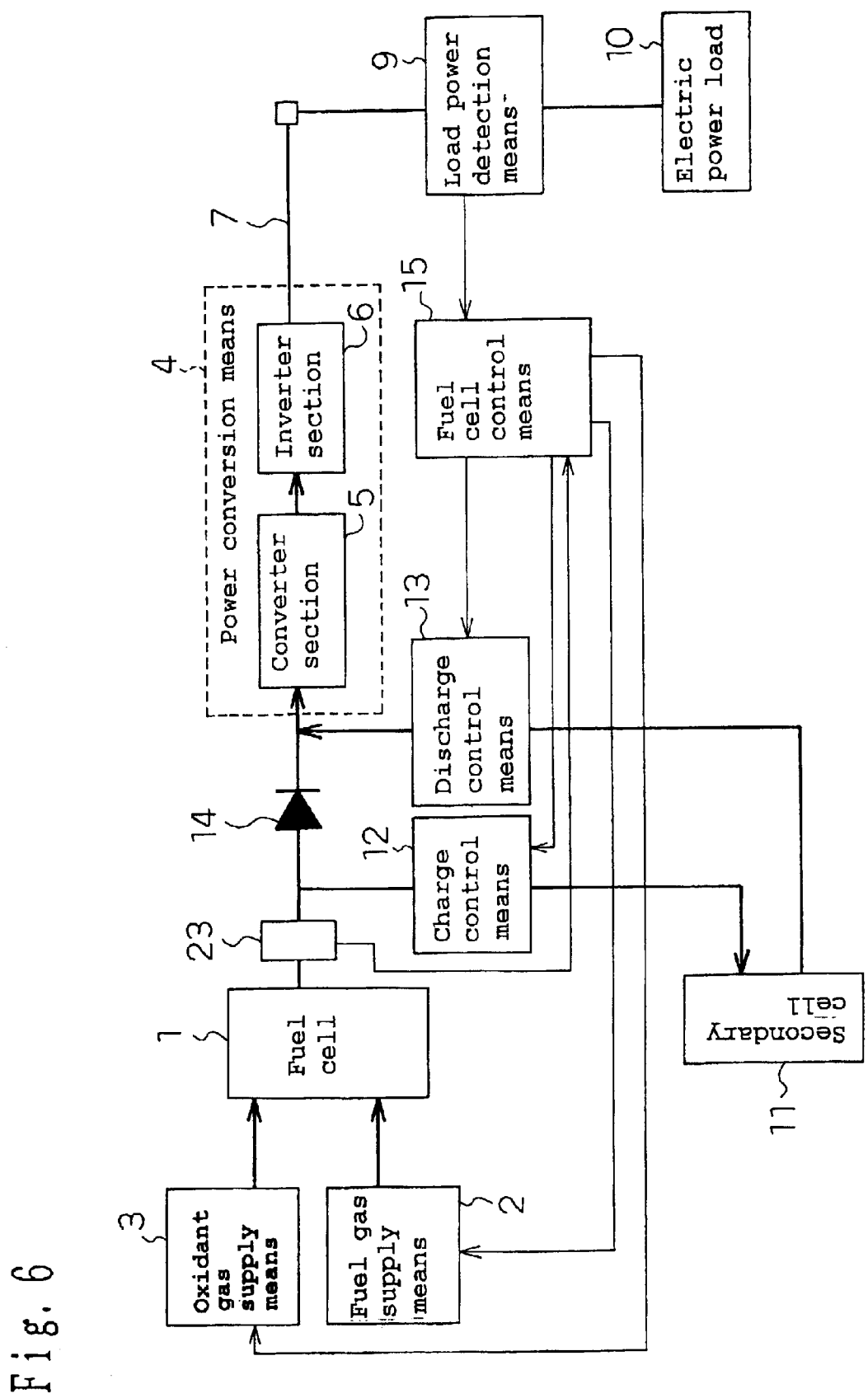
FIG. 6 is a block diagram of a fuel cell power generation apparatus in the fifth embodiment of the present invention.
Figure 7:
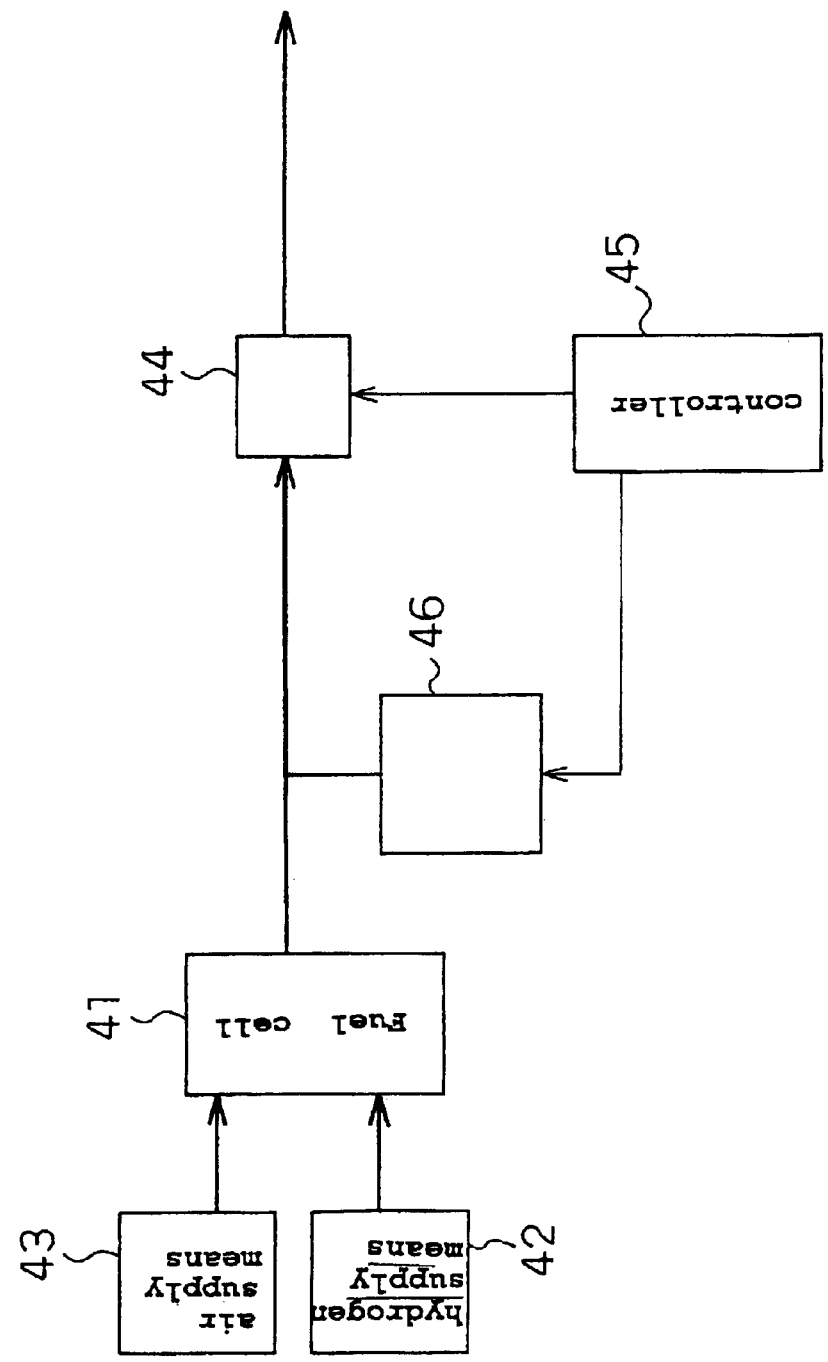
FIG. 7 is a block diagram of a conventional fuel cell power generation system.

FIG. 6 is a block diagram of a fuel cell power generation apparatus in a fifth embodiment of the present invention. In FIG. 6, the same numerals are assigned to parts having the same functions as those of the fuel cell power generation apparatus of the first embodiment shown in FIG. 1, and the fuel cell power generation apparatus of the second embodiment shown in FIG. 3, and the detailed description of those functions will be omitted as those corresponding to those in FIGS. 1 and 3.

This embodiment is characterized by the configuration that fuel cell output voltage detection means 23 detecting an output voltage of the fuel cell 1 is installed to correct the quantity of a step-up voltage or a step-down voltage in the charge and discharge control to the secondary cell 11 due to the decrease of an output voltage to an output current corresponding to an electric power load in connection with the aged degradation or the like of the fuel cell 1.

Next, the operation of this fifth embodiment will be explained. Nevertheless, portions similar to those in the above-described embodiments will be omitted, and, difference will be mainly described.

Figure 2:
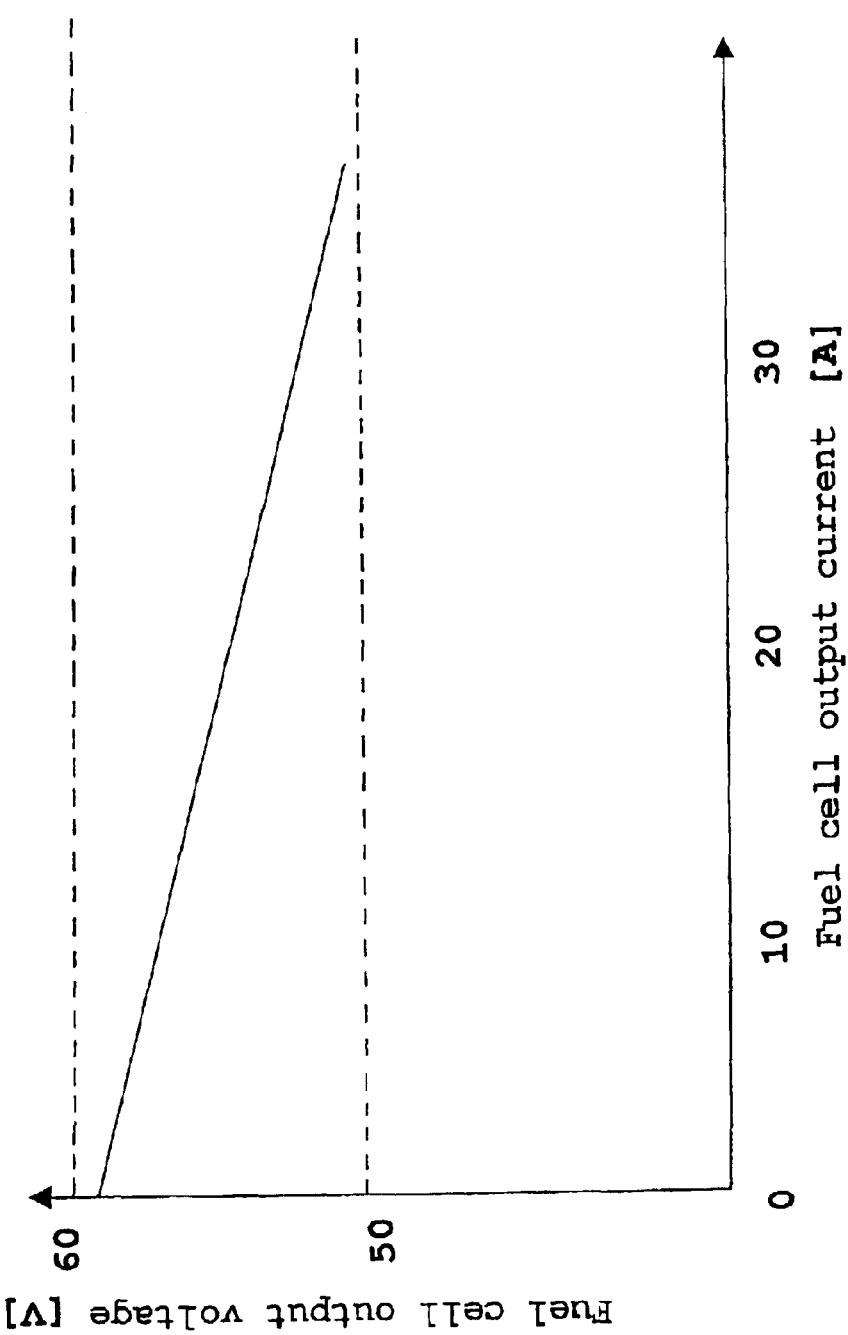
FIG. 2 is a characteristic graph of a fuel cell output of a fuel cell power generation apparatus in a fifth embodiment of the present invention.

Though an output voltage of the fuel cell 1 generally has a characteristic of decreasing with the increase in an output current of the fuel cell 1 as shown in FIG. 2 along with aged degradation etc. this output characteristic itself shifts to the direction of decreasing to the voltage as a whole. The fuel cell control means 15 always monitors an output voltage of the fuel cell 1 to the load power of the electric power load 10 by the fuel cell output voltage detection means 23 and load power detection means 9. When a shift (output voltage decrease) of an output voltage characteristic to the load power of the fuel cell 1 arises, the fuel cell control means 15 adjusts the voltage difference as correction quantity of a step-up voltage level or a step-down voltage level in the charge-discharge control of the charge control means 12 and discharge control means 13 of the secondary cell 11 as power storage means.

Hence, the fuel cell control means 15 always monitors an output voltage of the fuel cell 1 to properly secure the correction quantity of a step-up voltage or a step-down voltage in charge and discharge control to the power storage means for the decrease of an output voltage to an output current corresponding to the electric power load according to the aged degradation of the output characteristic or the like. Hence, it is possible to provide a power generation apparatus that has high reliability and high maintainability.

In addition, in the above-described embodiments, the fuel cell 1 is an example of the DC power generation means of the present invention, the secondary cell 11 is an example of the power storage means of the present invention, the converter section 5 is an example of the DC/DC converter of the present invention, the power conversion means 4 is an example of the power conversion means of the present invention, the load power detection means 9 is an example of the detection means of the present invention, and the fuel cell control means 15 is an example of the control means of the present invention.

Moreover, the charge control means 12 is an example of the charge-side conversion means of the charge and discharge means of the present invention, and the discharge control means 13 is an example of the discharge-side conversion means of the charge and discharge means of the present invention. Furthermore, the charge and discharge control means 18 is an example of the common conversion means of the charge and discharge means of the present invention, the current switching means 16 is an example of the first control switch of the present invention, and the current switching means 17 is an example of the second control switch of the present invention. In addition, the back flow preventing diode 14, and the connection paths 100a, 100b, 100c, 101a, 101b, and 101c are included in the charge and discharge means of the present invention.

Moreover, the fuel cell output voltage detection means 23 is an example of the output voltage detection means of the present invention, and a set of current sensors 19 and 20, and fuel cell control means 15 is an example of the electric power storage detection means of the present invention. Furthermore, a set of timing means 21 and fuel cell control means 15 is an example of the load power measurement means of the present invention, and the electric energy memory means 22 is the means included in the control means of the present invention. In addition, electric energy monitor information stored in the electric energy memory means 22 is an example of the premeasured electric energy of the present invention.

Moreover, though a fuel cell power generation apparatus is described as an example of a power generation system of the present invention in each embodiment described above, the present invention can be also realized as a power controller in the configuration of omitting the fuel cell 1, fuel gas supply means 2, oxidant gas supply means 3, and electric power load 10 from the configuration of each embodiment.

Figure 11:
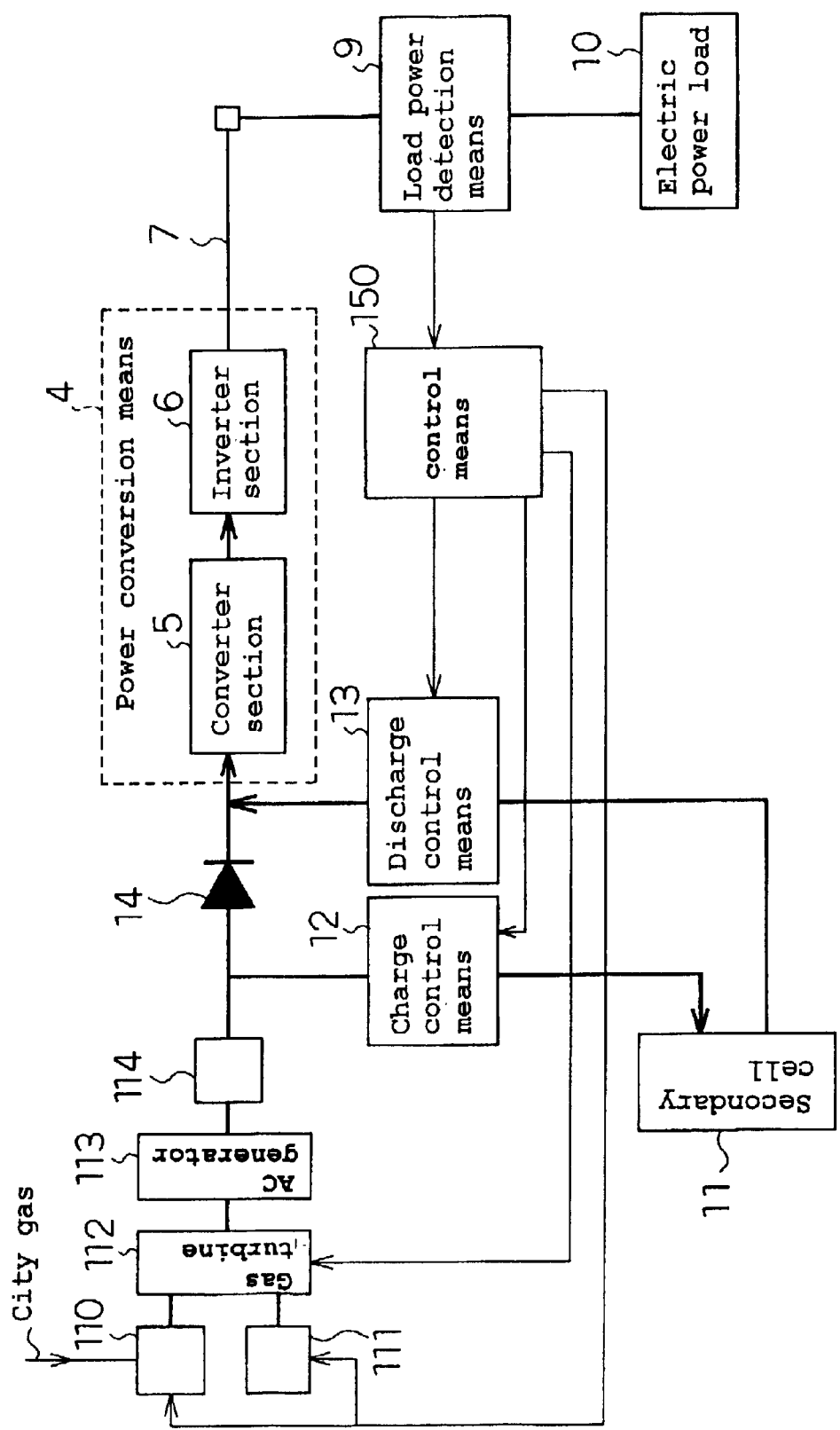
FIG. 11 is a diagram showing the configuration of another embodiment of the present invention.

In addition, in a power generation system of the present invention, the DC power generation means need not be limited to a fuel cell, and is not limited to its type so long as it is an apparatus which can generate DC power, such as a battery, a gas turbine power generator, and a thermoelectric generator using the Seebeck effect. As an example, the configuration of using a gas turbine power generator is shown in FIG. 11. As shown in the figure, the gas turbine power generator comprises: a gas turbine 112 operating with a city gas supplied from a city gas supply section 110 controlled by control means 150, and air supplied from an air supply section 111 controlled by the control means 150; an AC generator 113 connected to the gas turbine 112; and an AC-DC converter 114 that converts a high frequency AC output of the AC generator 113 into DC power. Fundamentally, this is similar to the case of the fuel cell 1. Even when the gas turbine 112 is made to operate so that the power supply of the AC generator 113 may become constant, it is possible to control electric power by the charge control means 12 and discharge control means 13 making secondary cell 11 charge or discharge electricity according to the electric power load 10.

As apparent from the above description, the present invention can provide a power controller with high economy and reliability that improves the energy efficiency of power storage means or the like.

What is claimed is:

1. A power controller comprising:
   power storage means of storing DC power outputted from DC power generation means that generates DC power;
   power conversion means including at least a DC/DC converter that converts a voltage when receiving a DC input;
   charge and discharge means of discharging electric power from the power storage means to the power conversion means and of charging DC power from the DC power generation means in the power storage means, the charge and discharge means being electrically coupled between the DC power generation means and the power conversion means;
   detection means of detecting electric energy of an external power load to which power from at least the power conversion means is supplied; and
   control means of controlling operation of the charge and discharge means on the basis of the detected electric energy, wherein the charge and discharge means has a DC/DC conversion function, converts an output voltage of the DC power generation means into a charge voltage of the power storage means, and converts a discharge voltage of the power storage means into an output voltage of the DC power generation means.

2. The power controller according to claim 1, wherein the control means performs control of making the charge and discharge means perform the charge operation when the external power load is low, and making the charge and discharge means perform the discharge operation when the external power load is high.

3. The power controller according to claim 1, wherein the amount of converted voltage between an output of the DC power generation means and an input of the power storage means is smaller than the amount of converted voltage between an output of the DC power generation means and an input of the DC/DC converter of the power conversion means.

4. The power controller according to claim 1, wherein the charge and discharge means comprises:
    charge side conversion means of converting an output voltage of the DC power generation means into a charge voltage of the power storage means; and
    discharge side conversion means of converting a discharge voltage of the power storage means into an output voltage of the DC power generation means.

5. The power controller according to claim 1, wherein the charge and discharge means comprises:
    common conversion means of performing a charge side conversion operation in which an output voltage of the DC power generation means is converted into the charge voltage of the power storage means and a discharge side conversion operation in which a discharge voltage of the power storage means is converted into an output voltage of the DC power generation means;
    a first control switch of performing control so that an input side of the common conversion means is connected to an output side of the DC power generation means or an output side of the power storage means; and
    a second control switch of performing control so that an output side of the common conversion means is connected to an input side of the DC/DC converter or an input side of the power storage means, and
    when the charge side conversion operation is performed, the first control switch connects the output side of the DC power generation means to the input side of the common conversion means while the second control switch connects the output side of the common conversion means to the input side of the power storage means, and
    when the discharge side conversion operation is performed, the first control switch connects the output side of the power storage means to the input side of the common conversion means while the second control switch connects the output side of the common conversion means to the input side of the DC/DC converter.

6. The power controller according to claim 1, further comprising output voltage detection means of detecting an output voltage of the DC power generation means, wherein on the basis of the detected output voltage and the detected load power, the control means makes the charge and discharge means perform the charge operation when the detected output voltage is high and the detected load power is low, and makes the charge and discharge means perform the discharge operation when the detected output voltage is low and the detected load power is high.

7. The power controller according to claim 1, further comprising power storage detection means of detecting power storage of the power storage means, wherein the control means controls operation of the charge and discharge means on the basis of the detected power storage.

8. The power controller according to claim 6, further comprising load power measurement means of measuring the detected electric energy as a function of time, wherein a power generation schedule of the DC power generation means is determined on the basis of electric energy measured beforehand by the electric load power measurement means.

9. A power generation system comprising:

the power controller according to claim 1;

DC power generation means of generating DC power; and control means of DC power generation means of controlling input energy of the DC power generation means on the basis of the detected electric energy.

10. A control method of the power controller according to claim 1, wherein the electric energy is measured as a function of time, and a power generation schedule of DC power generation means is determined on the basis of the electric energy obtained by the measurement.

11. The power controller of claim 1 additionally comprising:

back flow preventing means provided between the DC power generation means and the discharge means for substantially preventing a back flow of DC power from the discharge means to the DC power generation means, and wherein the charge means is directly electrically coupled to the DC power generation means.

* * * * *

UNITED STATES PATENT AND TRADEMARK OFFICE
CERTIFICATE OF CORRECTION

PATENT NO. : 6,800,963 B2
DATED : October 5, 2004
INVENTOR(S) : Miyauchi et al.

It is certified that error appears in the above-identified patent and that said Letters Patent is hereby corrected as shown below:

Title page,
Item [57], ABSTRACT, Line 3, "generation means that" should read -- generation means --.

Column 12,
Line 50, "outputted" should read -- output --.

Signed and Sealed this

Twenty-sixth Day of April, 2005

JON W. DUDAS
*Director of the United States Patent and Trademark Office*